United States Patent [19]
Parish, II et al.

[11] Patent Number: 6,047,757
[45] Date of Patent: Apr. 11, 2000

[54] ANGLED SIDEWALL FUSING APPARATUS

[75] Inventors: Robert Owen Parish, II, Cleveland, Tex.; Joseph G. Gho, Vancouver, Canada; Randall Jeff Kozak, Surrey, Canada; Garry Joseph Anderson, Vancouver, Canada

[73] Assignee: Global Utility Technologies Ltd., London, United Kingdom

[21] Appl. No.: 09/037,823

[22] Filed: Mar. 10, 1998

[51] Int. Cl.[7] .................................................. B29C 65/20
[52] U.S. Cl. ...................... 156/499; 156/304.2; 156/503; 156/510
[58] Field of Search .............................. 156/304.2, 304.6, 156/499, 503, 510

[56] References Cited

U.S. PATENT DOCUMENTS

| | | |
|---|---|---|
| 3,253,972 | 5/1966 | Huddleston . |
| 3,616,024 | 10/1971 | Windle . |
| 3,634,167 | 1/1972 | Plontke . |
| 3,723,229 | 3/1973 | Hutton . |
| 3,743,566 | 7/1973 | Louthan et al. . |
| 3,966,528 | 6/1976 | Christie .................................... 156/293 |
| 4,174,248 | 11/1979 | Carroll et al. . |
| 4,533,424 | 8/1985 | McElroy .................................. 156/378 |
| 4,542,892 | 9/1985 | Goldner ..................................... 269/41 |
| 4,556,207 | 12/1985 | Thompson et al. . |
| 5,013,376 | 5/1991 | McElroy, II .............................. 156/64 |
| 5,445,309 | 8/1995 | Yamada et al. . |
| 5,505,811 | 4/1996 | Welch et al. . |
| 5,613,807 | 3/1997 | Reber ..................................... 405/156 |
| 5,624,140 | 4/1997 | Allen et al. . |

FOREIGN PATENT DOCUMENTS

57-46859  3/1982  Japan .

Primary Examiner—Steven D. Maki
Attorney, Agent, or Firm—Mary J. Gaskin

[57] ABSTRACT

The present invention is directed to an apparatus for fusing a sidewall pipe onto a host pipe at an angle of less than 90°. The apparatus prevents the angled sidewall pipe from migrating during the fusing operation. Also provided is a radius cutter for cutting the radius of the angled sidewall pipe to match the concave upper surface of the host pipe.

5 Claims, 7 Drawing Sheets

ANGLED SIDEWALL FUSING APPARATUS

FIELD OF THE INVENTION

The present invention is directed to the field of fusing a polyolefin pipe onto the sidewall of another polyolefin pipe at an angle of less than 90°. The invention is related to co-pending application Ser. No. 08/985,636, filed Dec. 5, 1997.

BACKGROUND OF THE INVENTION

"Plastic pipe" is made from materials in the polyolefin family and its alloys, primarily because polyolefin can be fused together rather than glued or joined with rubber gaskets. Polyolefin pipe is replacing ball and spigot PVC pipe, ductile iron pipe, vitrified clay pipe, concrete and even steel pipe, where heat, high pressure, and deflection from ground loading are not factors of concern. Polyolefin pipes are almost completely unaffected by corrosive and unstable ground conditions. For example, polyolefin pipe is being used to transport corrosive chemicals, waste water, potable water, storm water, and for irrigation systems, leachate systems, and petrochemical collection systems.

A number of circumstances require fusing two pieces of polyolefin pipe together. The process of fusing polyolefin pipe consists of placing two matching surfaces on either side of a heat source, heating the surfaces to a predetermined temperature, removing the heat source, and forcing the two surfaces together under pressure.

Various factors affect the fusing of two pieces of polyolefin pipe. Polyolefin pipe is manufactured in many different wall thicknesses and diameters. In addition, fuses of the two pipes may be performed in a wide range of environments, from shops with controlled conditions to open pits subject to ground and weather conditions. An effective fusing apparatus would have to adapt to all such conditions. Further, depending on the result desired, the two pieces of pipe may be fused end to end (butt fusing) or with the end of one joined to the sidewall of the host pipe (sidewall fusing). Butt fusing is generally easier to accomplish. Sidewall fusing is accomplished by either of two methods: (1) fusing a fabricated saddle with a pipe nipple already attached onto the sidewall of the host pipe; or (2) fusing a sidewall pipe onto the host pipe. In order to perform a successful fuse in the latter case, the concave radius of one end of the sidewall pipe must match the outside convex radius of the host pipe.

Prior art devices accomplishing sidewall fusing are described in U.S. Pat. Nos. 3,998,682, 4,533,424, 4,542,892, and 5,613,807. Fusing machines currently being used employ manually-operated screws, hand-pumped hydraulics, auxiliary-powered, high pressure hydraulics, or a combination of these in order to provide the movements and pressures necessary to complete a sidewall fusion. Machines employing manually operated screws or hand-pumped hydraulics are slow, preventing an operator from joining the heated surfaces together quickly after the heat source is removed. Auxiliary-powered, high-pressure hydraulic machines must have valves, hoses, and cylinders capable of operating at high pressures, making the machines heavy and expensive; additionally, replacement power units for such machines are not readily available at rental outlets and contractor supply houses.

U.S. Pat. Nos. 5,364,207, 5,339,335 and 5,613,807 disclose and claim methods and apparatus for fusing a pipe onto the sidewall of a host pipe. The patents disclose fusing when a sidewall pipe is situated perpendicular to the axial alignment of the host pipe. None of the patents disclose a method or apparatus for performing a fuse when the sidewall pipe is situated at an angle other than 90° to the axial alignment of the host pipe.

A number of circumstances require the fusing of sidewall pipe to a host pipe at an angle that is less than 90°. Due to flow characteristics (i.e., sewer service leads), designers may need to have the flow enter a pipe in the direction of the existing flow. Presently, the only ways to accomplish this are: (1) cutting into the previously sealed line and inserting a fitting, using a wrap-around clamp to seal the cut; (2) fusing a sidewall pipe at a 90° angle and using prefabricated bends to obtain a different angle; or (3) purchasing a fuse-on saddle with a fabricated nipple already attached at the desired angle. The latter fitting costs over twenty times the cost of a 90° sidewall fuse. In addition, the saddle fitting only has a short nipple, and an adapter fitting or coupling is needed to extend the sidewall saddle nipple.

An apparatus which accomplishes fusing at an angle of less than 90° would be a far less expensive method of providing an ideal, sealed system. However, such an apparatus would have to solve the problem presented by applying fusing pressure to an angled sidewall pipe when it is being fused onto the host pipe. Ordinarily, when pressure is applied to a sidewall pipe in any configuration other than perpendicular to the host pipe, the heated surface of the sidewall pipe in contact with the heating plate or the heated portion of the host pipe will begin to migrate (slide), along a path in axial alignment and radial perpendicular alignment with the host pipe, in the direction of the angle supplementary to the angle formed by the alignment of the sidewall pipe to the host pipe. In addition, such an apparatus would have to be able to be easily removed after an angle fusing operation is completed. None of the apparatus and methods disclosed in the prior art are capable of performing such angled fuses.

SUMMARY OF THE INVENTION

The present invention is capable of fusing a piece of polyolefin pipe onto the sidewall of another polyolefin pipe at an angle of 90° or less. The invention is also directed to providing a device to cut a precise concave radius to each sidewall pipe, at an angle of 90° or less.

The invention consists of a base, extension rods, a travel head, an angle clamp, a radius cutter and a control panel. All functions may be performed electrically, electronically, manually, pneumatically, hydraulically, or any combination of these methods.

The base provides pipe clamps for attaching the fusing machine to the host pipe, an attachment for the hinged heating plate, attachments for the extension rods upon which the travel head moves, and a centralizing plate. The extension rods provide guide means for the movement of the travel head perpendicular to the host pipe, as well as means to secure the travel head in proper fusing positions. The travel head provides a second point of alignment for the perpendicular alignment of the sidewall pipe to the host pipe; means of moving the sidewall pipe away from the host pipe so the heating plate can be removed; and means of applying pressure to the sidewall pipe during the fusing process.

The angle clamp provides means to maintain the sidewall pipe at an angle of less than 90° to the host pipe. The angle clamp also takes the perpendicular force applied by the travel head and transfers it to the angled, concave surface of the sidewall pipe. The type of angle clamp used depends on the desired angle of the fused sidewall pipe; the lower end of the angle clamp is cut to coincide with the angle of the lower end of the sidewall pipe to be fused (for example, 30°, 45°, and 60°).

The radius cutter precisely cuts the radius of a sidewall pipe at any angle of 90° or less; the typical cuts made at 22.50°, 30°, 45°, and 60°, but can be any angle from 11° to 90°.

The control panel, attached to the fusing machine by means of control cables, controls and monitors the fusing operation.

The primary object of this invention is to provide a fusing apparatus which can fuse sidewall pipe to a host pipe at an angle of less than 90°.

Another object of this invention is to apply pressure to the angled concave surface of the sidewall pipe during fusing in a manner which results in true pipe conformation, with no migration of the sidewall pipe.

A further object of the invention is to provide a cutter to cut the angled radius of the sidewall pipe at any angle from 11° to 90°.

BRIEF DESCRIPTION OF THE DRAWINGS

FIGS. 8–10 are simplified drawings of the angle fusing machine in operation.

DESCRIPTION OF THE PREFERRED EMBODIMENT

Figure 1:
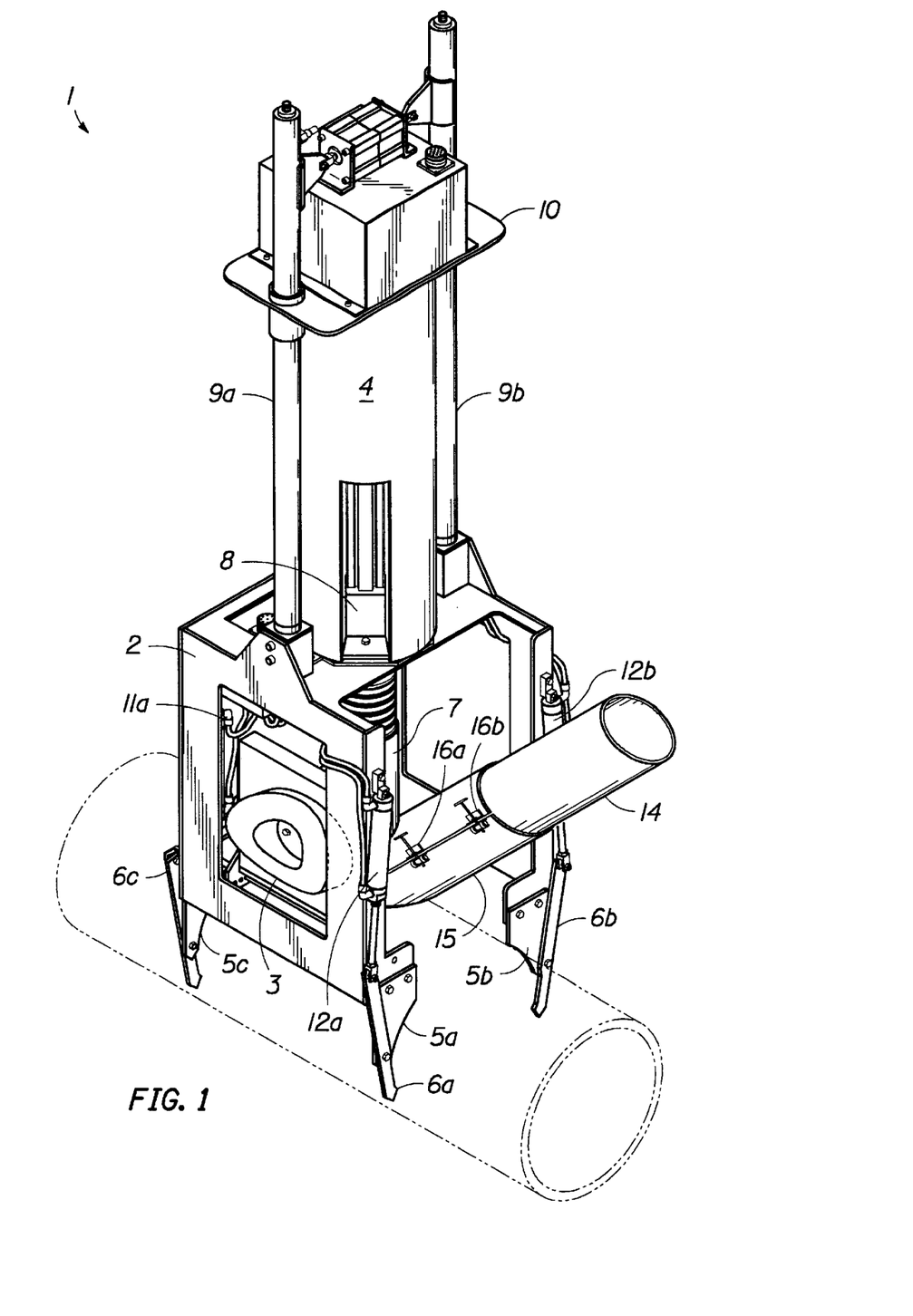
FIG. 1 is a side perspective view of the angle fusing machine of the present invention.

Referring to FIG. 1, the preferred angle fusing machine of the present invention is shown. The angle fusing machine 1, constructed primarily of stainless steel and aluminum, includes a base 2, a hinged, elliptical heating plate 3 of Teflon-coated aluminum, a stack housing 4, partial radius plates 5a and 5b disposed one on each of two corners of the base 2 (leaving the side of the base 2 open to accommodate the angled sidewall pipe), radius plate 5c disposed on the other side of the base 2, movable pipe clamping arms 6a, 6b, 6c, (6d hidden), a bladder 7, a bladder plate 8, extension rods 9a, 9b, and a travel head 10. Heating plate pneumatic cylinders 11a (11b hidden) control the movement of the heating plate 3. Pipe clamping pneumatic cylinders 12a, 12b, (12c hidden) facilitate clamping the fusing machine 1 to the host pipe. A sidewall pipe 14 is clamped in the sidewall pipe clamp 15, which is secured with T-bolts 16a, 16b.

Figure 2:
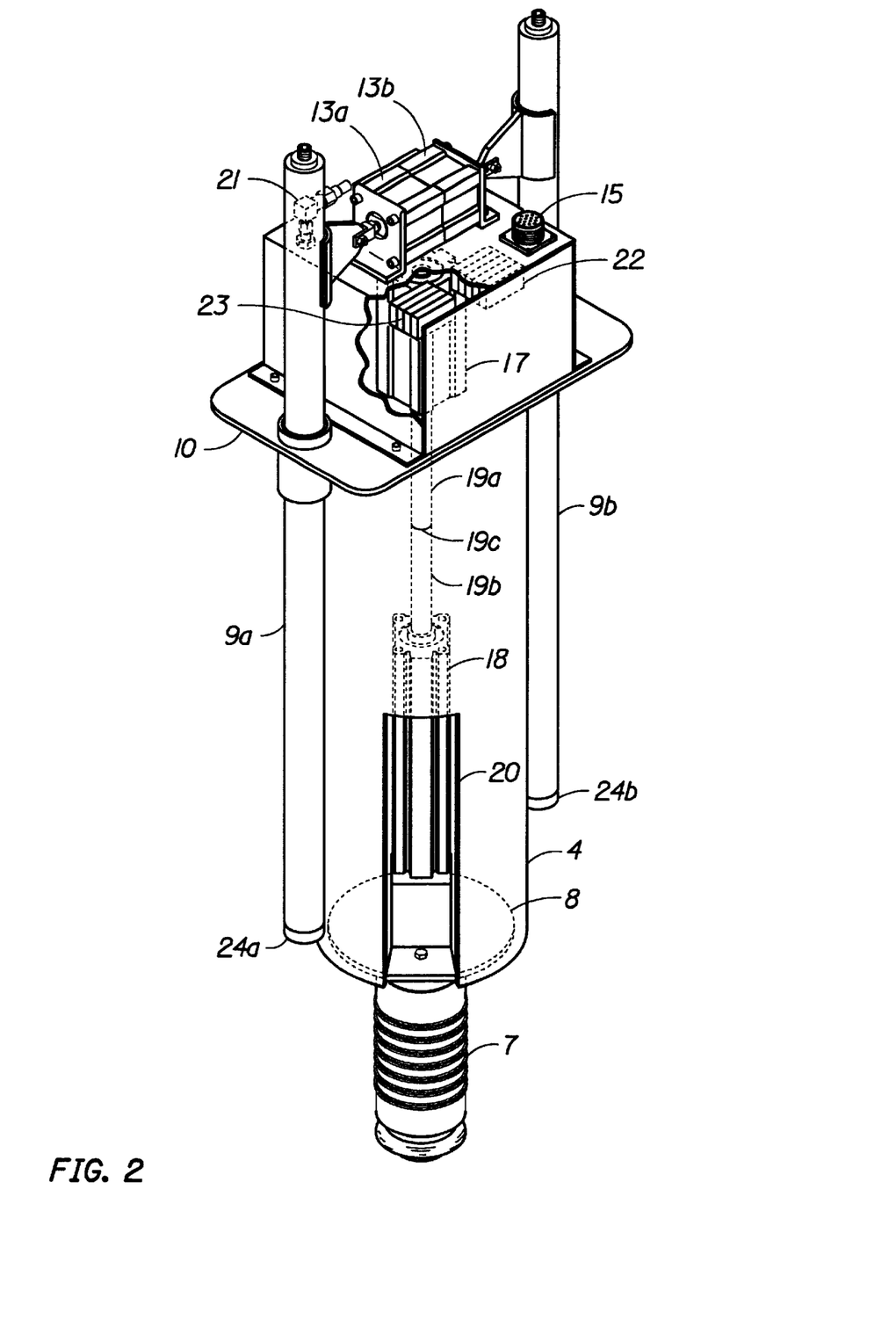
FIG. 2 is a side perspective view of the travel head portion of the angle fusing machine, showing parts of the travel head interior in cutaway.

FIG. 2 shows fusing pneumatic cylinder 17 disposed within the travel head 10. Stack loading cylinder 18 is disposed within stack housing 4. Cylinder rods 19a, 19b between cylinders 17 and 18 are coupled together at 19c. At the lower end of stack loading cylinder 18 is a bladder plate 8, and below that the bladder 7, an inflatable rubber plug. A notch 20 prevents stack loading cylinder 18 from allowing the stack to rotate. Air is supplied to the fusing pneumatic cylinder 17 through travel head air connection 21. Electrically-activated air regulators 22 and solenoids 23 control all functions of travel head 10. The travel head 10 is connected to base 2 at extension rod ends 24a, 24b. Information from a control panel (not shown) is received at travel head electrical control connection 15, controlling vertical movement of the travel head 10 along the extension rods 9a, 9b. Rod clamping cylinders 13a, 13b lock the travel head 10 in place.

Figure 3:
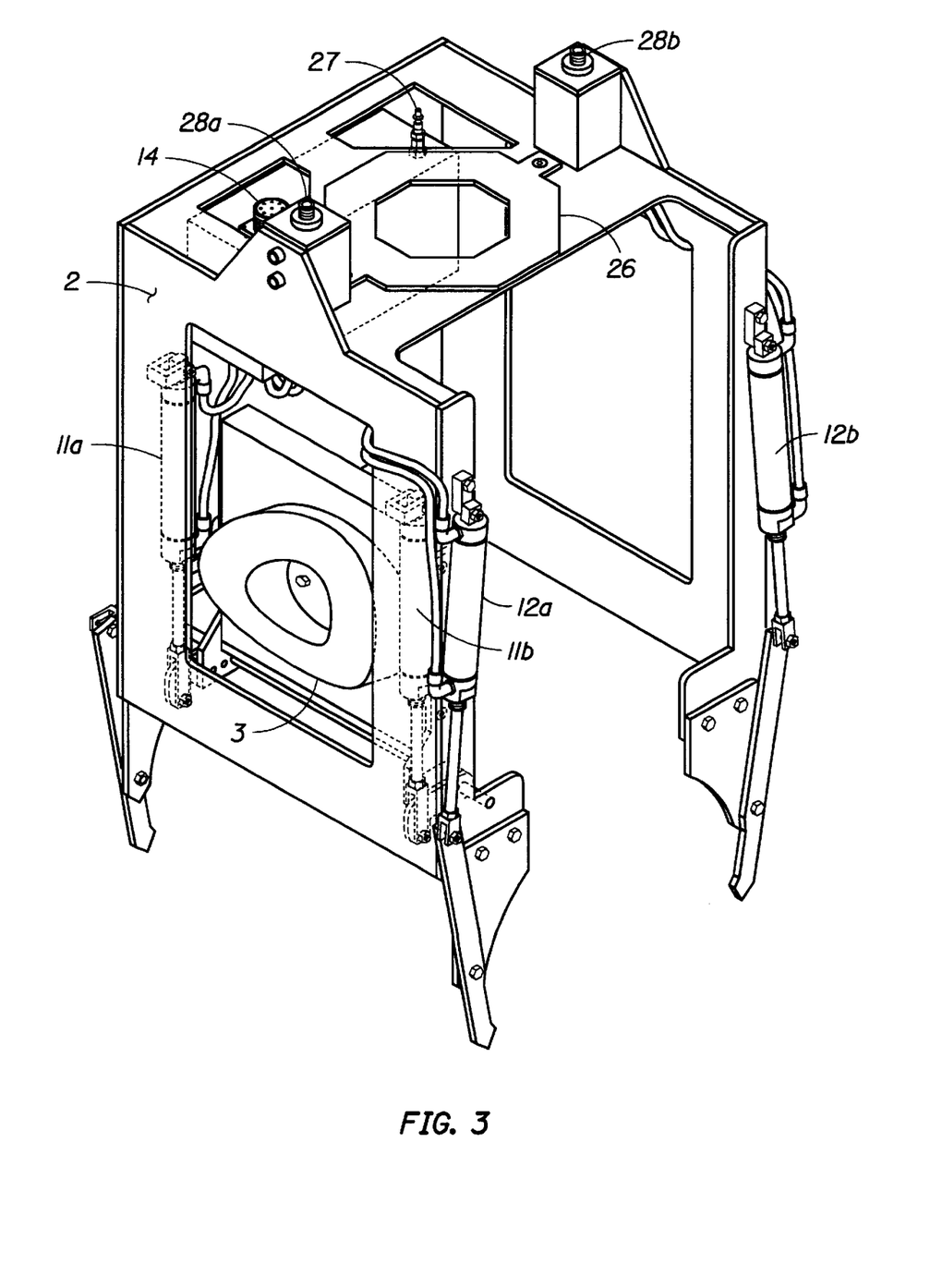
FIG. 3 is a side perspective view of the base of the angle fusing machine, showing parts of the interior of the base in cutaway.

FIG. 3 shows only the base 2 of the fusing machine 1. The heating plate 3 is in a raised position. The stack centering plate 26 keeps the sidewall pipe in proper alignment to the host pipe. Air is supplied to heating plate pneumatic cylinders 11a, 11b and pipe clamping pneumatic cylinders 12a, 12b through base air connection 27. Extension rod connection ends 24a, 24b (shown in FIG. 2) are threaded onto the base connectors 28a, 28b. Information from a control panel is transmitted through the base electrical control connection 14.

Figure 4:
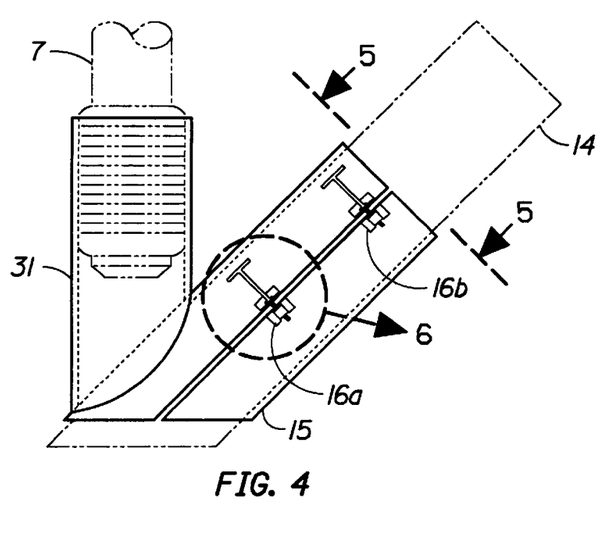
FIG. 4 is a side cutaway view of an angled sidewall pipe in the bolted sidewall pipe clamp.
Figure 5:
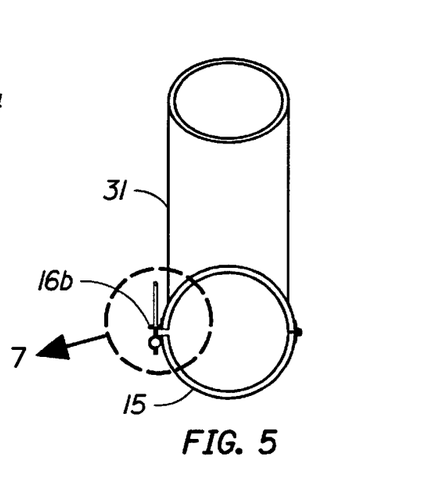
FIG. 5 is an end view of the sidewall pipe clamp detailing the T-bolt attachment.
Figure 6:
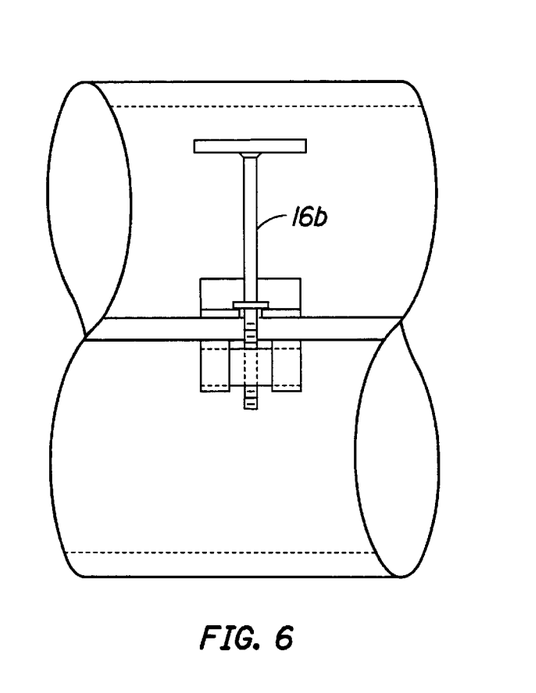
FIG. 6 is a side view of FIG. 4 showing a side view of the T-bolt attachment.
Figure 7:
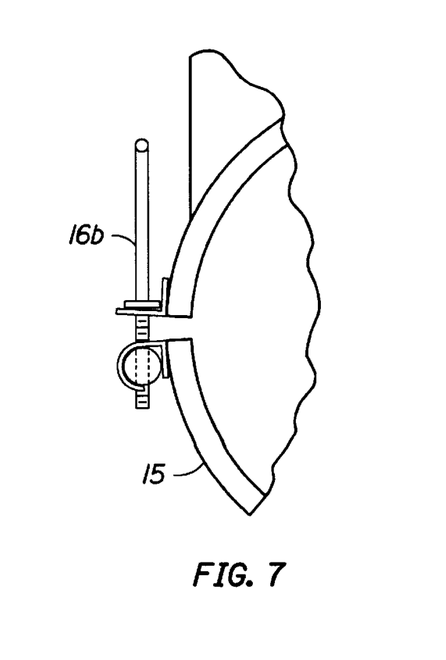
FIG. 7 is an enlarged detail of the T-bolt attachment shown in FIG. 5.

FIG. 4 shows the sidewall pipe 14 clamped into the sidewall pipe clamp 15 by T-bolts 16a, 16b. The T-bolts 16a, 16b tighten the sidewall pipe clamp 15 around the sidewall pipe 14 to prevent movement during fusing. The sidewall pipe clamp selected for a particular fuse has a lower end cut to coincide with the cut end of the sidewall pipe being fused. An attachment pipe 31 is attached to the hinged portion of the sidewall pipe clamp 15 so that the sidewall pipe clamp 15 can be attached to the angle fusing machine 1. The bladder 7 has been lowered into the attachment pipe 31; it has been inflated, thereby allowing the sidewall pipe clamp 15 to be raised and lowered. FIG. 5 shows an end view of the sidewall pipe clamp 15, illustrating the T-bolt 16b which is tightened to secure the sidewall pipe 14 in place. FIG. 6 shows a side view of the T-bolt 16b on the sidewall pipe clamp 15. FIG. 7 is an enlarged view of the T-bolt 16b, which tightens the sidewall pipe clamp 15.

Figure 8:
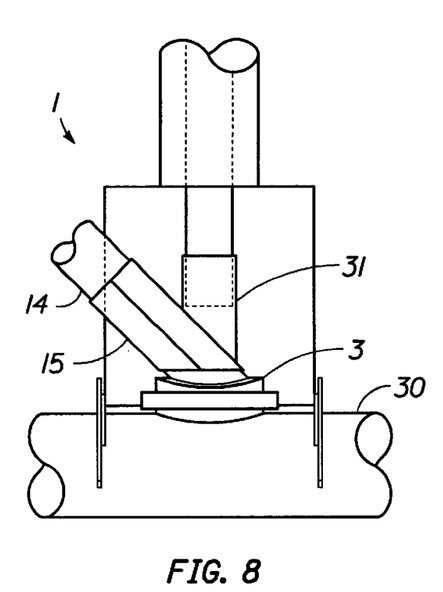
FIG. 8 shows a back view of the angle fusing machine clamped onto the host pipe, with the heating plate lowered and the sidewall pipe clamp lowered.
Figure 9:
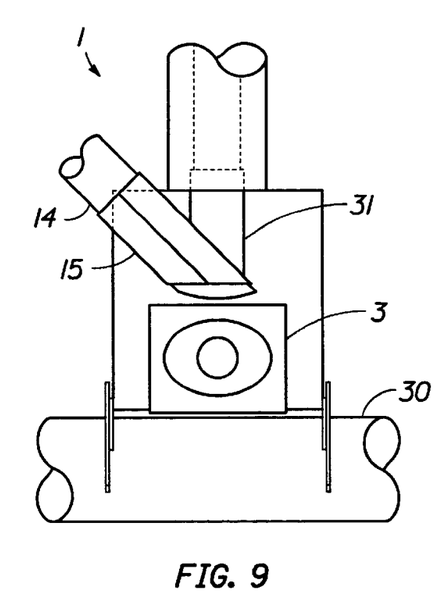
FIG. 9 shows a back view of the sidewall pipe clamp and heating plate in a raised position.
Figure 10:
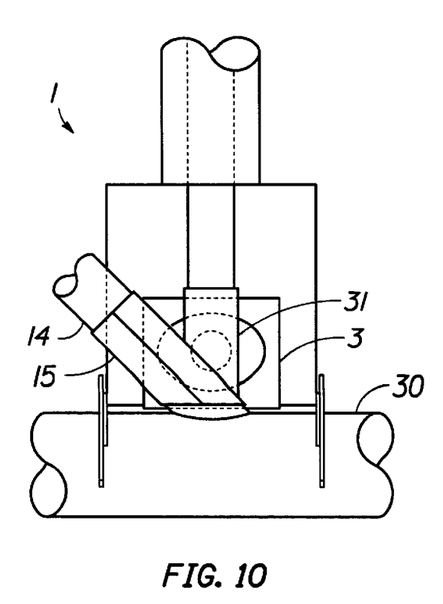
FIG. 10 shows a back view of the sidewall pipe as it is being fused to the host pipe.
Figure 11:
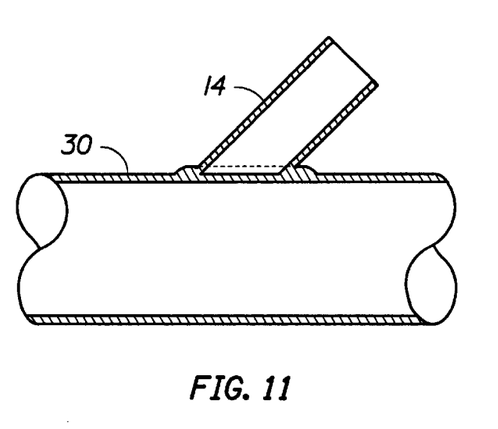
FIG. 11 is a cutaway view of the sidewall pipe after it has been fused onto the host pipe.

FIG. 8 shows a back view of the angle fusing machine 1 clamped onto the host pipe 30, with the heating plate 3 lowered onto the host pipe 30. The attachment pipe 31 holding the sidewall pipe clamp 15 with a sidewall pipe 14 has been lowered onto the heating plate 3 to facilitate seating of the heating plate 3 on the host pipe 30. FIG. 9 shows a back view of the attachment pipe 31 holding the sidewall pipe clamp 15 in a raised position, with the heating plate 3 raised. FIG. 10 shows a back view of the sidewall pipe 14 as it is fused onto the host pipe 30 by the angle fusing machine 1. The angle fusing machine 1 keeps the sidewall pipe 14 from migrating as it is being fused onto the host pipe 30. FIG. 11 shows the sidewall pipe 14 after it has been fused onto the host pipe 30 and the angle fusing machine 1 has been removed.

Figure 12:
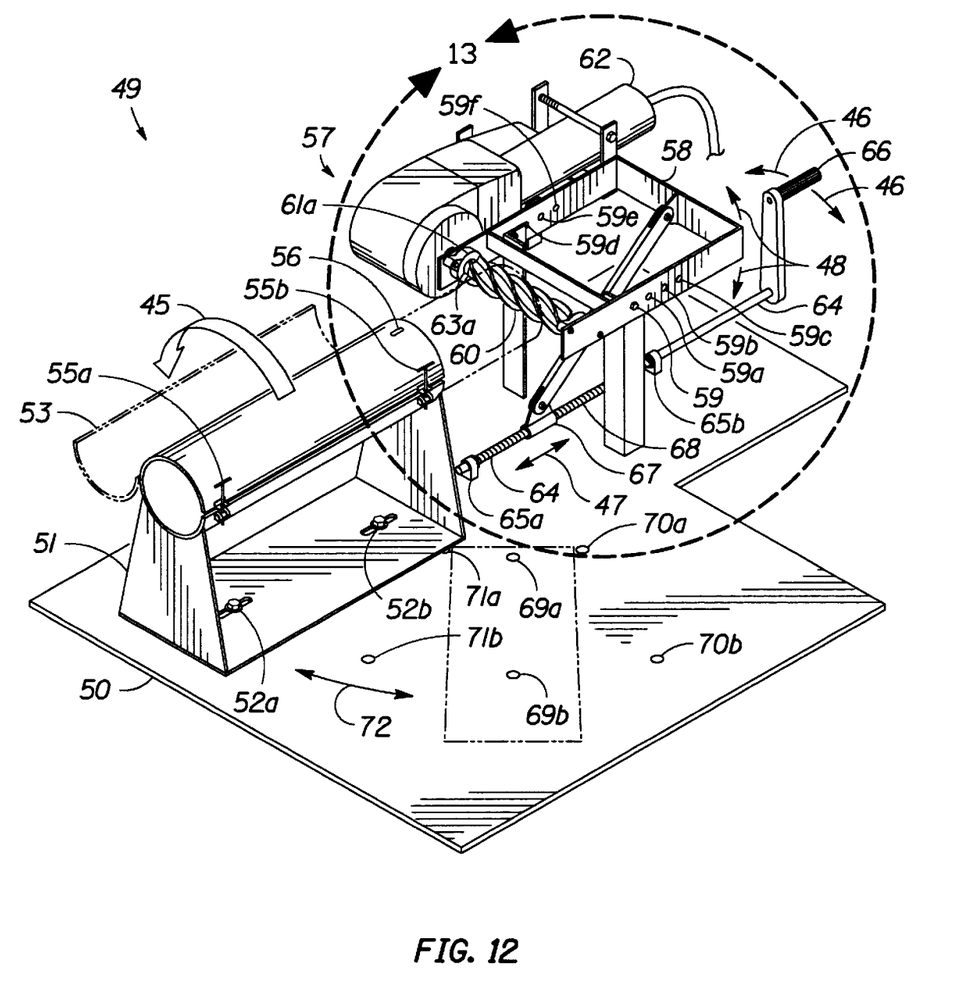
FIG. 12 is a perspective view of the portable radius cutter assembly.

In order to successfully fuse sidewall pipe to a host pipe, the radius of the sidewall pipe must be cut to match the radius of the host pipe. FIG. 12 shows a portable radius cutter assembly 49 which can do so. A radius pipe clamp 51 constructed from steel or aluminum is bolted onto a base 50 constructed of steel or aluminum at holes 52a, 52b. The hinged top portion 53 of the radius pipe clamp 51 is flipped open 45 and a sidewall pipe 14 laid onto the radius pipe clamp 51. The top portion 53 is closed to encase the sidewall pipe 54. A centrally-located slot 56 in the top portion 53 of the radius pipe clamp 51 is used to align the radius pipe clamp 51. "T" bolts 55a, 55b are used to tighten the radius pipe clamp 51. The sidewall pipe 14 must be held firmly in place, with no movement in any direction. The radius pipe clamp 51 must also dampen any vibration in the sidewall pipe 14 during the cutting operation.

The mill cutter assembly 57 has a frame 58 which has axis holes 59a, 59b, 59c, 59d, 59e, 59f which act as radius hinge points to change the radius cuts depending on the position of radius pin 59 (other pin hidden). The frame 58 supports the bearings 61a, 61b on the milling bit 60 and supports the power source 62. The custom made milling bit 60 of the mill cutter assembly 57 has a reduced shaft on each end 63a, (63b hidden) to allow the mounting of the bearings 61a, 61b, a fluted cutting area for cutting the sidewall pipe 14, and means for attachment of a rotary power source 62.

A threaded travel rod 64 attaches to the base 50 by mounted bearings 65a, 65b. The travel rod 64 is rotated 46 by either manual means such as the handle at 66, or by mechanical means. A travel nut 67 threaded onto the travel rod 64 is connected to the frame 58 by means of a linkage rod 68 which is hinged on both ends. The linkage rod 68 prevents the travel nut 67 from rotating as the travel rod 64 rotates. Rotation of the travel rod 64 causes the travel nut 67 to move either forward or backward 47, causing the frame 58 to move in an arc 48, either up or down, cutting the radius of the sidewall pipe 14.

The power source 62 can be powered by an electrical motor, compressed air, or hydraulics. The power source, which must provide sufficient torque and rotation to the mill cutter assembly 57 to cut high density, polyethylene pipe, typically must produce between 250 to 700 rotations per minute (rpm's).

Before operating the radius cutter assembly 49, the end of a sidewall pipe 54 is cut straight at the angle at which the sidewall pipe 14 will be fused onto the host pipe 30, such as 30°, 45°, or 60°. The radius cutter assembly 49 is then set up to cut a radius which will match the host pipe. The radius pipe clamp 51, which is situated perpendicular to the mill cutter assembly 56 for a standard 90° fuse, can be unbolted and moved to dispose the sidewall pipe 14 at an angle to the mill cutter assembly 56, allowing an angled radius to be cut. FIG. 12 shows the alternate bolt holes 69a, 69b, which would be used to secure the radius pipe clamp 51 in order to have a 45°0 angled cut. Other premarked holes 70a, 70b, 71a, 71b in the base 50 show the proper position to which the radius pipe clamp 51 must be moved 72 in order to make other correctly angled radius cuts (i.e., 60°, 30°).

After the radius pipe clamp 51 has been secured, the radius hinge point (determined by placement of the radius pin 54 in an axis hole [alternatives 59a, 59b, 59c and 59d, 59e, 59f]) on the frame 47 is adjusted to match the radius of the host pipe 30. As the handle 66 is rotated, the milling bit 60 moves in an arc determined by the placement of a radius pin 59 in an axis hole (59a, 59b, 59c, and 59d, 59e, 59f are alternative positions); other radius pin is hidden. The milling bit 60 engages the outside diameter of the sidewall pipe 14 to ensure that the resulting radius cut extends from the top to the bottom of the sidewall pipe 14.

Figure 13:
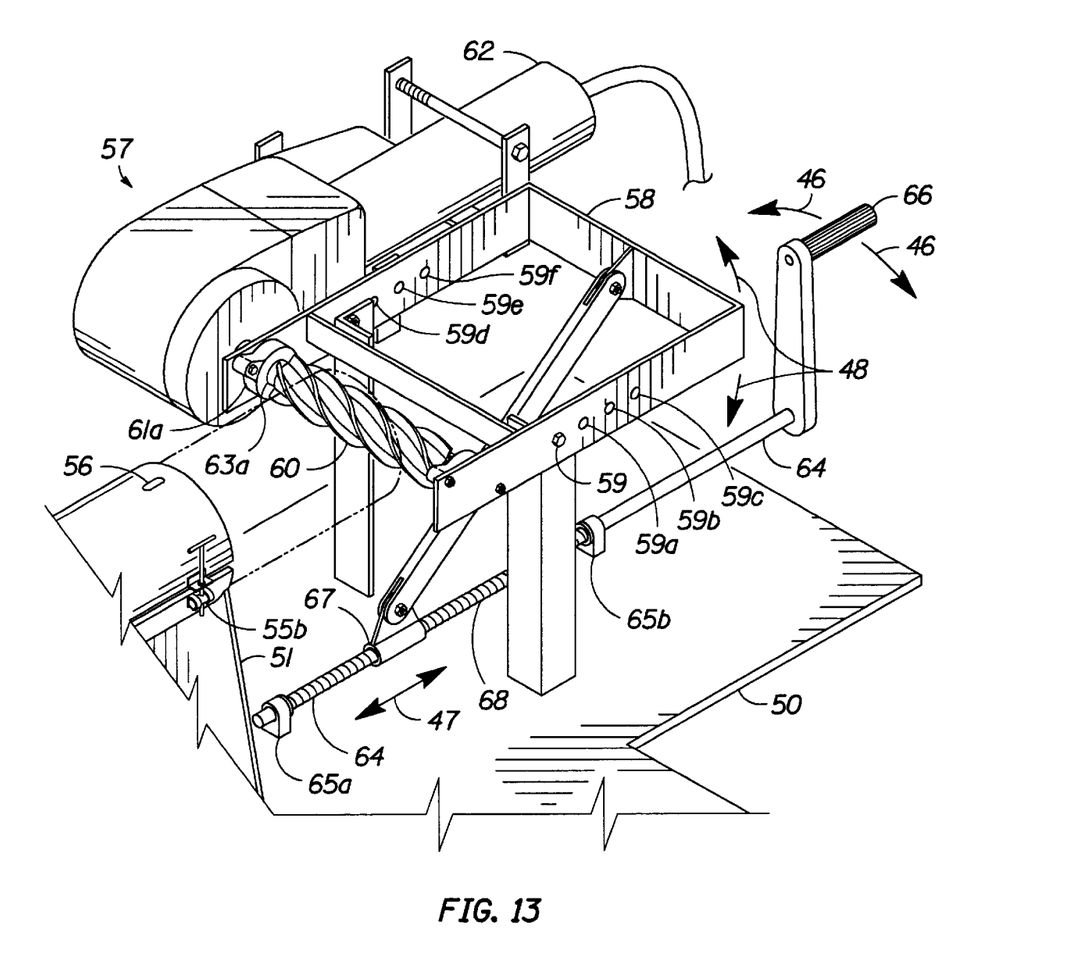
FIG. 13 is an enlarged view of the mill cutter assembly.

FIG. 13 shows the mill cutter assembly 49 in greater detail.

What is claimed is:

1. A fusing apparatus comprising a base, wherein the base includes clamping means for clamping onto a polyolefin main pipe, rods that extend from said base to a movable travel head with holding means for an angle sidewall pipe clamp that encloses a polyolefin sidewall pipe, and a heating plate for heating an area of said main pipe and an end of said sidewall pipe to be fused together, the heating plate being hinged to said base, said apparatus capable of fusing said sidewall pipe to said main pipe at an angle less than 90° wherein:

(1) said base has an opening to accommodate positioning the sidewall pipe at an angle less than 90° with respect to the main pipe;

(2) said angle sidewall pipe clamp is removably attached to said holding means, a lower end of the angle sidewall pipe clamp having been straight cut on an angle such that said lower end is disposed in a parallel relationship to the main pipe when the angle sidewall pipe clamp is attached to the holding means;

(3) the angle sidewall clamp is capable of clamping said sidewall pipe such that said sidewall pipe is positioned at an angle less than 90° with respect to the main pipe; and (4) said holding means includes an inflatable bladder within an attachment pipe which is attached to said angle sidewall pipe clamp to thereby allow raising and lowering of said angle sidewall pipe clamp and said sidewall pipe has a cut lower end defining a radius which matches the radius of the main pipe.

2. The fusing apparatus of claim 1 wherein the straight cut lower end of the angle sidewall pipe clamp and an axis of the angle sidewall pipe clamp defines an angle of 11° to 89°.

3. The fusing apparatus of claim 2 further comprising a portable radius cutter for cutting the lower end of the sidewall pipe such that the cut lower end of the sidewall pipe defines a radius that matches the radius of the main pipe.

4. The fusing apparatus of claim 3 wherein the radius cutter comprises a radius pipe clamp for clamping the sidewall pipe while the lower end thereof is being cut and a mill cutter assembly for cutting the lower end of the sidewall pipe such that the cut lower end of the sidewall pipe defines a radius which matches the radius of the main pipe.

5. The fusing apparatus of claim 1 wherein an axis of the holding means bisects the axis of the angle sidewall pipe clamp at an uppermost surface of the main pipe.

\* \* \* \* \*